United States Statutory Invention Registration [19]

[11] Reg. Number: H805

Schriver et al. [43] Published: Aug. 7, 1990

[54] EXHALATION DUCT

[75] Inventors: John G. Schriver, Baltimore, Md.; William L. Riffel, Jr., Wilmington, Del.; John D. Scheible, Chestertown, Md.

[73] Assignee: The United States of America as represented by the Secretary of the Army, Washington, D.C.

[21] Appl. No.: 409,268

[22] Filed: Sep. 18, 1989

Related U.S. Application Data

[63] Continuation of Ser. No. 191,082, May 6, 1988, abandoned.

[51] Int. Cl.[5] ..... A62B 7/02

[52] U.S. Cl. ..... 128/201.22

[58] Field of Search ..... 128/201.15, 201.17, 128/201.29, 202.19, 204.18; 2/435, 436, 437; 264/506

[56] References Cited

U.S. PATENT DOCUMENTS

| | | | |
|---|---|---|---|
| 232,233 | 9/1880 | Beyer | 128/201.25 |
| 1,418,264 | 5/1922 | Lamb | 128/201.15 |
| 2,800,901 | 7/1957 | Monro | 128/201.15 |
| 2,814,290 | 11/1957 | Holmes | 128/202.11 |
| 2,821,192 | 1/1958 | Monro | 128/201.15 |
| 3,529,594 | 9/1970 | Charnley | 128/201.29 |
| 4,197,841 | 4/1980 | Brauer et al. | 128/201.13 |
| 4,360,493 | 11/1982 | Kramer, Sr. et al. | 264/506 |
| 4,382,440 | 5/1983 | Kapp et al. | 128/201.25 |

*Primary Examiner*—Charles T. Jordan
*Assistant Examiner*—Michael J. Carone
*Attorney, Agent, or Firm*—Anthony T. Lane; Edward Goldberg; Edward F. Costigan

[57] ABSTRACT

An exhalation duct is formed from a gas impermeable covering layer having spacer material extending through the length of the duct to define a substantally cylindrical opening. A lower end of the duct is formed with a plurality of exhalation holes or openings in the covering layer and an elastic end receiving the air supply hose of a self-contained air supply breathing apparatus. The upper end of the exhalation duct seals to an exhalation valve of breathing apparatus to direct exhalation air from the mask, entirely through the duct, for discharge through the holes formed in the lower end. In operation, the lower end of the exhalation duct is positioned within the torso area of a protective hood jacket to prevent internal fogging of the hood jacket mask.

3 Claims, 9 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

EXHALATION DUCT

The invention described herein may be manufactured, used and licensed by and for the government for governmental purpose without the payment to us of any royalties thereon.

This application is a continuation of application Ser. No. 191,082, filed May 6, 1988, now abandoned.

TECHNICAL FIELD

The present invention relates generally to apparatus for protecting workers from percutaneous poisoning and toxic environments. More particularly, the invention relates to an exhalation duct for a hood jacket worn over self-contained breathing apparatus to enable the wearer to perform tasks within a toxic environment without fogging the mask of the breathing apparatus.

BACKGROUND OF THE INVENTION

In our co-pending U.S. patent entitled "Protective Hood Jacket Resistant to Toxic Environments" U.S. Pat. No. 4,864,654 depicted in FIGS. 1–3 herein as discussed more fully below, there is disclosed a hood-jacket 10 as being formed with a hood portion **10*b* and jacket portion 10*a* preferably made of panels of Chloropel fabric heat-sealed together to form a single protective garment. Hood-jacket 10 as best illustrated in FIG. 1, is worn over a self-contained air supply breathing apparatus (such as the M23A1 self-contained air supplied breathing apparatus) which breathing apparatus generally comprises an air cylinder 12 strapped to the wearer's back, a regulator assembly 14 having various instrument gauges (not shown in detail) strapped to the wearer's waist and a face mask 16 connected to regulator 14 with air hose 18 extending upwardly along the wearer's chest region for connection to an inlet valve 16*a* of the mask. As will be seen more fully below, hood-jacket 10 is designed to fit over the M23A1 type BA illustrated in the drawings as well as other BAs. Hood jacket 10** is also designed to fit any wearer, regardless of size.

As will be seen more fully below, hood-jacket 10 is preferably formed from panels of material resistant to toxic chemicals, which panels may be heat-sealed together along their peripheries to form the basic garment of the hood-jacket. A plastic vinyl material is used to form a visor 20 which is easily heat-sealed along its periphery to the fabric panels forming the hood portion **10*b*. The hood-jacket 10 is preferably of hip length and short-sleeved. There may be a large hump 22 (FIG. 1) formed in the rear portion of the jacket 10*a* to accommodate air cylinder 12** of the BA and to allow for forward bending.

There is a combination closure in the back of jacket portion **10*a*, as best depicted in FIG. 3, comprising a metal zipper 23 and a Chloropel zip-loc closure 25** for sealable opening and closing of the jacket portion rear for air bottle replacement and donning/doffing of the garment.

In addition to the foregoing seals 23,25, vapor leakage is in general mechanically reduced by two types of seals within hood-jacket 10 of the invention. The first type, as will be seen below, encompasses the garment peripheries at the hip and sleeve ends. These seals incorporate cable drawstrings and are adjustable. The second type constitute internal collars, a few inches up from the ends of the sleeves and around the waist and neck. These elastic collars are also self-adjustable. The elastic collar inside the hood, in the neck area, is designed to further reduce vapor infiltration into the area. This collar may have a frontal velcro closure which fastens around the BA mask inlet air tube.

As discussed above, hood portion **10*b* is that portion of hood-jacket 10 which is worn over the head. Hood portion 10*b* is preferably a combination of chlorinated polyethylene plastic material and, in particular fabric panels 26 thereof which may be heat-sealed together as at 27 (FIG. 3). The panels 26 are also heat-sealed to visor 20 as depicted in FIG. 2. Visor 20, such as polyvinyl chloride (PVC) of transparent optical quality, may constitute a major portion of hood 10*b*** to provide for optimum viewing conditions by the wearer.

The torso or jacket portion **10*a* of hood-jacket 10 is also formed of chlorinated polyethylene fabric panels 26*a* that may be heat-sealed together at their peripheries (see FIG. 3) as at 29 to form the basic jacket configuration. A pair of sleeves 30 also formed of chlorinated polyethylene heat-sealable plastic material are heat-sealed to the fabric panels 26*a* of jacket portion 10*a* (see, e.g., FIG. 3). The hood and jacket fabric panels 26,26*a* and visor 20 are then heat-sealed together as depicted in FIG. 2 to form the basic outer garment of the hood-jacket. A chlorinated polyethylene fabric strip 33 (FIG. 2**) may be used to connect the hood or visor and jacket fabric panels together in heat-sealing relationship.

An anti-fog kit schematically shown at 35 may be fixed to a portion of fabric panels 26 of hood **10*b* outside seal 27 as depicted in FIG. 3. More specifically, anti-fog kit 35 is secured to a grommet 37 heat-sealed to fabric panel portions 26 atop the hood and secured thereto by string 37*a*. Anti-fog kit 35 consists of instructions, an anti-fog compound and a wiping cloth all enclosed in a plastic bag 35*a*. The compound is a medium hard wax-type substance that is applied like a crayon over the inner surface of visor 20 and gauge viewing windows 39 and 41** discussed infra. The compound is then rubbed with the fingers to cover the entire areas and the excess is removed by means of the wiping cloth. Its purpose is to reduce fogging of the inside of visor surfaces for clearer vision.

Oval gauge window 39 and square gauge window 41 are both assembled in the front part of jacket portion **10*a*, as depicted in FIG. 2. Their function is to allow the user to view the front mounted pressure gauges forming part of regulator 14 of the BA worn beneath the hood-jacket 10. It is to be noted that each window 39 and 41 is preferably made of the same PVC material as visor 20 and heat-sealed into the fabric panels 26*a*** of the jacket.

With reference now to FIG. 3, the combination closure 25 is heat-sealed in the rear of jacket portion **10*a* and comprises an inner metal zipper 23 and an outer double channel zip-loc plastic zipper (not shown in detail) 40 providing a good mechanical seal. The functions of zippers 23,40 are to establish an opening in the rear of jacket portion 10*a* on each half thereof for donning/doffing the hood-jacket 10 and for access to air cylinder 12 for replacement, without removing the garment. For a good air-tight seal, the two channels of zip-loc 40 are preferably filled with petroleum jelly on one side prior to donning. The zip-loc 40 may be opened by grasping adjacent pull tabs 42*a* and 42*b* starting at the bottom of the jacket to pull the zip-loc apart. The tabs 42*a*, 42*b* are mounted on reinforcement fabric strips 43 which overlap fabric panels 26** to provide a one inch in width heat seal all around the closure opening (FIG.

3). The double plastic channels 40 of the zip-loc plastic zipper are fixed to these reinforcement panels as depicted in FIG. 3.

Waist draw cord 47 is pulled tight to the waist of the wearer and held in place by a B-lock fastener 49. Waist collar barrier 50 is pulled snug about the waist higher than the draw cord 47 and fastened by means of hook and pile fasteners 51 and 53 sewn to the ends of the waist collar barrier. The waist collar barrier is preferably formed by a piece of elastic webbing positioned within a channel formed by an overlapping lower edge of the fabric panel at 57. Waist draw cord 47 is also formed within a channel formed by overlapping a piece of fabric panel 26*a* and then heat-sealing the same together.

The neck collar barrier 70 is also defined by a piece of elastic webbing 72 received within a closed channel 73 formed in a chlorinated polyethylene length of material 74 having heat-sealed overlapping edges which material is also heat-sealed to fabric panels 26*a*. The neck collar barrier 70 is thereby located inside hood-jacket 10 at the base of hood 10*b* to effect a seal between the inside of the jacket area and the hood.

The waist draw cord 47 and the sleeve draw cord 60 are the initial means of producing an air-tight seal. The waist collar barrier and the sleeve collar barrier 65 are secondary seals to prevent leakage into the jacket area. The waist, sleeve and neck collar barriers are preferably made of a thinner chlorinated polyethylene material which are heat-sealed to the inside of the hood-jacket fabric panels 26, 26*a* in the areas shown and have elastic webbing affixed to the inner portion which fits snug to those portions of the wearer's body. The neck collar barrier 70, which fits snug to the neck above the collar of the wearer's protective suit worn beneath, prevents any leakage in the jacket area from entering the hood area.

Neck collar barrier 70 preferably includes a split cone configuration 100 in the center of the front portion of the barrier material. The purpose of the split cone is to provide a means of sealing around the air supply hose 18 of the BA and the exhalation duct. The air hose 18 extends from the waist area up to the air mask 16 on the wearer's face. The exhalation duct hose (not shown) extends from the mask down into the chest area of the hood-jacket. A seal is effected around the air hose 18 and exhalation duct by the wrap around cone seal 100 and fastened in place by vertical and wrap around hook and pile fasteners.

More specifically, and with reference to FIGS. 3A–3D, the cone seal 100 is formed of neck collar barrier material (similar to the material forming collar 70) 102 folded into a cone shape having an upper diameter greater than the lower diameter. The cone seal 100 is open as at 104, the opening being defined by two edges 106*a* and 106*b* extending the entire length of the cone. A snap fastener having mating halves 108*a* and 108*b* are located at the top of each edge 106*a* and 106*b*, respectively, and hook and pile fastener strips 110 and 112 (e.g., Velcro) are secured on the inner vertical surface of seal material 102 adjacent the edges 106*a* and 106*b*. Tightening straps 114 having hook material 116 on one side and pile material 118 on the opposite side are vertically spaced from each other and secured to lower and middle portions of the cone seal.

Once the air hose and exhalation duct are positioned through the center of the cone seal 100, the vertical sides or edges 106*a* and 106*b* are wrapped snugly around the air hose and exhalation duct and the open edges 106*a* and 106*b* are brought together. The inside vertical hook and pile straps 110 and 112 contact each other and hold the cone in the FIG. 3C position. The final closure and seal is effected by snapping the fastener halves 108*a* and 108*b* together and wrapping the two adjustment and tightening straps 114 around the cone. The length of the straps 116 is sufficient so that the hook surface 116 on one side of the cone will contact the pile surface 118 on the other side so that the cone seal is fully closed as depicted in FIG. 3D in sealing contact with the air hose and exhalation duct.

The next seal 100 is secured to neck collar barrier 70 such as with stitching along the upper edges of the cone material 102. The cone suspends freely below the neck collar barrier 70 as depicted in FIG. 3A and the partial side elevation view of FIG. 3E.

The hood-jacket 10 of our invention has a unique combination of internal seals, such as the cable draw cords and internal collar barriers, which together with the overall hood-jacket configuration achieve an extremely tight fit resulting in essentially no internal leakage. The hood jacket 10 and BA are designed to be worn over protective rubber suits which are in current use. There may be a very small amount of leakage depending on the physical activity of the wearer, which may get past the draw cord and collar barrier seals of the waist and sleeve and into the torso area. However this occurs, it is contained between the outside of the protective suit and inside of the jacket part of the garment and the neck collar barrier. There is no wearer's skin exposed in this area.

Because of the neck collar seal 70, there tends to be a buildup of moisture inside the enclosed hood of the hood-jacket 10. This moisture disadvantageously causes fogging of the inside of the hood lens 20. The moisture buildup results from not only the perspiration of the skin of the wearer's head and neck, but also from the exhaled breath of the BA. Fogging caused by perspiration is somewhat controllable and, in any event, does not significantly contribute to the fogging problem. However, exhaled breath, which contains more than 60% moisture, is the most significant factor contributing to the fogging problem. This can be eliminated by venting exhaled breath outside of the enclosed hood. Venting through the hood wall to the outside involves sensitive valve assemblies and possibly dangerous backflow of contaminated outside air, and is therefore disadvantageous.

SUMMARY OF THE INVENTION

It is accordingly one object of the present invention to provide apparatus for venting exhaled air from an enclosed hood forming part of a protective garment to prevent fogging of the hood lens while minimizing any exposure of the wearer to outside contaminated air.

Another object of the present invention is to provide an exhalation duct that can be easily worn within a hood-jacket as part of a protective ensemble, i.e., a rocket fuel handler suit, rubber boots, rubber gloves, and a self-contained breathing apparatus worn within the hood-jacket.

Still a further object is to provide an exhalation duct that is inexpensive to manufacture, comfortable to wear, and that vents exhaled breath from the hood interior to within the jacket portion of the protective garment.

Yet another object is to provide different forms of exhalation ducts designed to accommodate various types of breathing apparatus.

These and other objects are realized in a preferred embodiment of this invention with an exhalation duct that is generally flexible along its length and has one end with sealing means providing sealing contact with the exhalation valve of a face mask of a breathing apparatus, and an opposite end provided with openings for directing exhalation gas outwardly from the duct. The inner diameter of the duct is greater than the outer diameter of an air supply hose extending through the duct and sealing end for connecting the inlet valve of the breathing mask to a source of bottled air carried on the wearer's back.

Preferably, the exhalation duct is formed of a spacer material defining a generally cylindrical duct. The spacer material has sufficiently rigid properties in the radial direction of the duct so as to maintain the interior region of the duct open along its entire length, i.e., without blockage. A protective covering is provided around the spacer material. The lower or discharge opening of the duct may be provided with vent holes for venting exhalation air into the jacket portion of the garment. The lower end of the duct also preferably includes an elastic end opening to enable easy insertion of the air supply hose through the duct for subsequent connection to the BA mask.

The upper sealed opening of the duct may take different forms defending upon the particular configuration of the exhalation valve and air supply connector of the BA mask. In one embodiment, the sealed opening includes a seal member having a first opening connectable to the exhalation valve located below the face mask and a second smaller opening through which the air supply hose extends for connection to the mask. In another embodiment, the upper sealed opening is a valve cover formed of flexible material adapted to fit entirely around the mask regulator. A corrugated rubber or flexible hose is attached to the exhalation valve cover and has an inner diameter greater than the outer diameter of the air supply hose.

The exhalation duct of the present invention may be utilized with any type of protective garment wherein a BA mask is worn by the user wherein fogging of the mask exterior is a problem.

Still other objects of the present invention will become readily apparent to those skilled in this art from the following description wherein there is shown and described a preferred embodiment of this invention simply by way of illustration of the best mode contemplated for carrying out the invention. As will be realized, the invention is capable of other embodiments, and its several details are capable of modifications in various obvious respects, all without departing from the invention. Accordingly, the drawing and description will be regarded as illustrative in nature and not as restrictive.

DETAILED DESCRIPTION OF THE INVENTION

Figure 12:
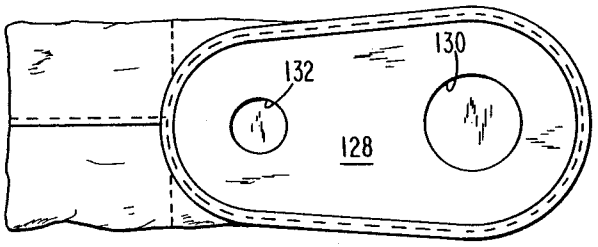
FIG. 12 is a detailed bottom plan view of the sealing end of the FIG. 4 exhalation duct.
Figure 13:
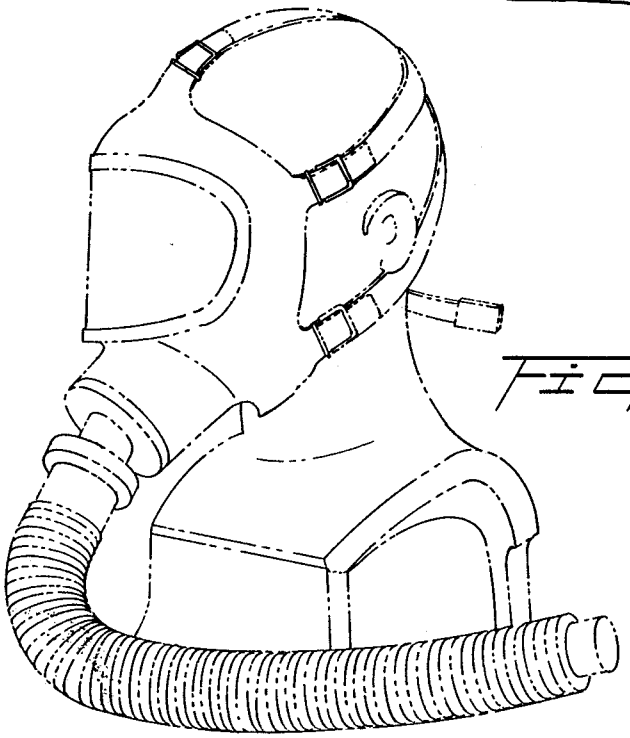
FIG. 13 is a perspective view of a type of BA mask used in conjunction with the exhalation duct of FIG. 4.

FIGS. 4–7 are illustrations of a first embodiment of an exhalation duct 120 according to the present invention designed for use in conjunction with the breathing apparatus depicted in FIG. 13 (commonly known as a Mine Safety Appliances BA, Model 401). The exhalation duct 120 comprises a covering 122 formed, for example, from a lightweight butyl coated cloth surrounding layers of spacer material 124 which may be very porous and substantially entirely enclosed by the cover 122. A rubber seal 126 is formed at one end of exhalation duct 120. The rubber seal 126 will define the upper end of the exhalation duct located within the hood portion **10*b* of hood jacket 10. The rubber seal 126, as best depicted in FIG. 12, includes a rubber sheet 128 formed with a first hole 130 adapted to receive the exhalation valve of the breathing apparatus and a second smaller hole 132 adapted to receive the inlet air hose 18** in sealing contact therewith.

The opposite or lower end 134 is an elastic end provided with a series of vent or exhalation holes 136 formed within the covering 122.

In operation, the air supply hose 18 of the breathing apparatus is inserted through elastic end 134, through the spacer material 124 and out the small hole 132 in the rubber seal 128 at the opposite or upper end. The air supply hose 18 is then reconnected to the mask and the large hole 130 of the rubber seal is stretched over the outlet valve of the mask, as described supra. The rubber seal 128 is adjusted up over the air hose connector and outlet valve. It is then pushed flush to the face piece. The exhalation duct is then fitted through the cone seal 100 and stretched along the torso such that the elastic end 134 terminates proximate the lower chest or abdominal area of the wearer. Thus, in operation, exhaled air is captured by the rubber seal and directed through the porous circular spacer material layers 124 along the length of the duct 120 and out through the exhalation holes 136 into the torso area. The seal 128 and covering 122 prevents exhaust air from entering either the hood portion **10*b* or upper torso area of the hood jacket portion 10*a*, i.e., the exhaled air is forced to flow entirely through the porous material of the exhalation duct until it reaches holes 136. Incoming air is brought through the hose 18** into the mask area as discussed supra.

The spacer material 124 has sufficiently rigid properties in the radial direction of the duct 120 so as to maintain the interior region of the duct open along its entire length, i.e., without blockage. The elastic end 134 enables easy insertion of the air supply hose through the duct for subsequent connection to the BA mask is discussed supra.

Figure 2:
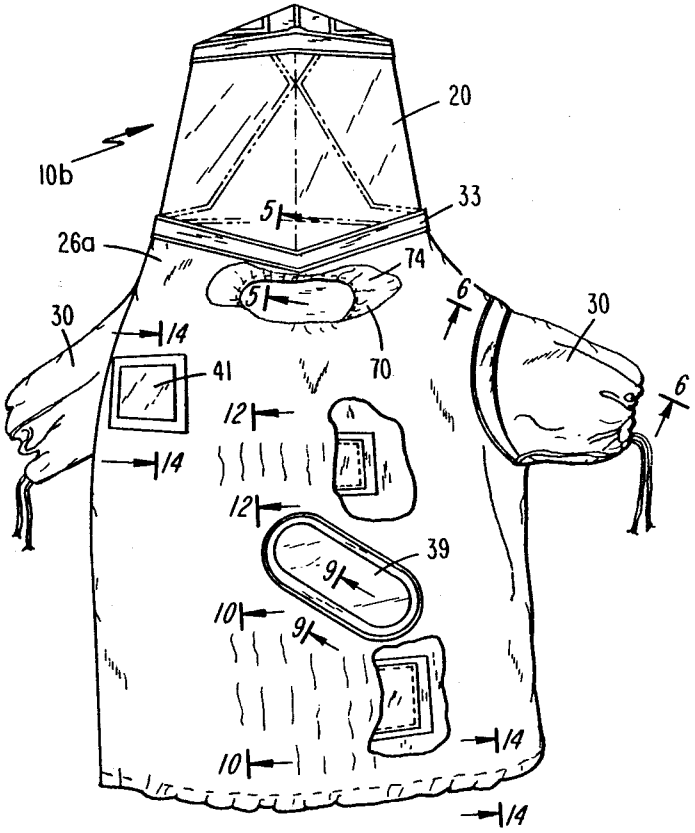
FIG. 2 is a front plan view of the hood-jacket.
Figure 1:
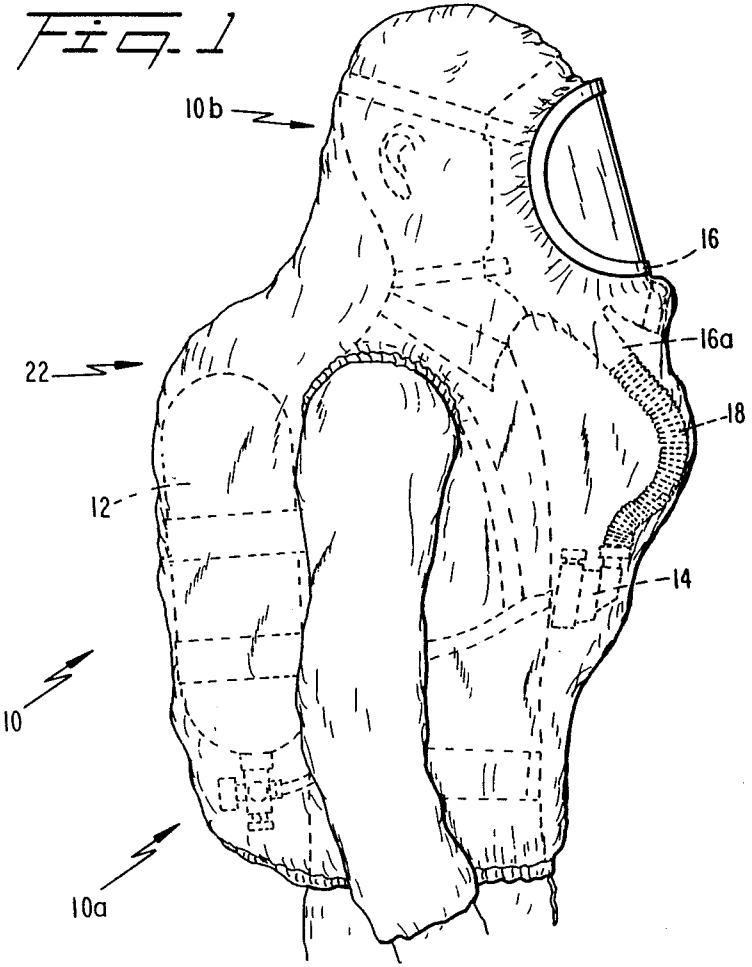
FIG. 1 is a perspective view of a hood-jacket and the exhalation duct of the present invention worn in combination with a BA mask.
Figure 3:
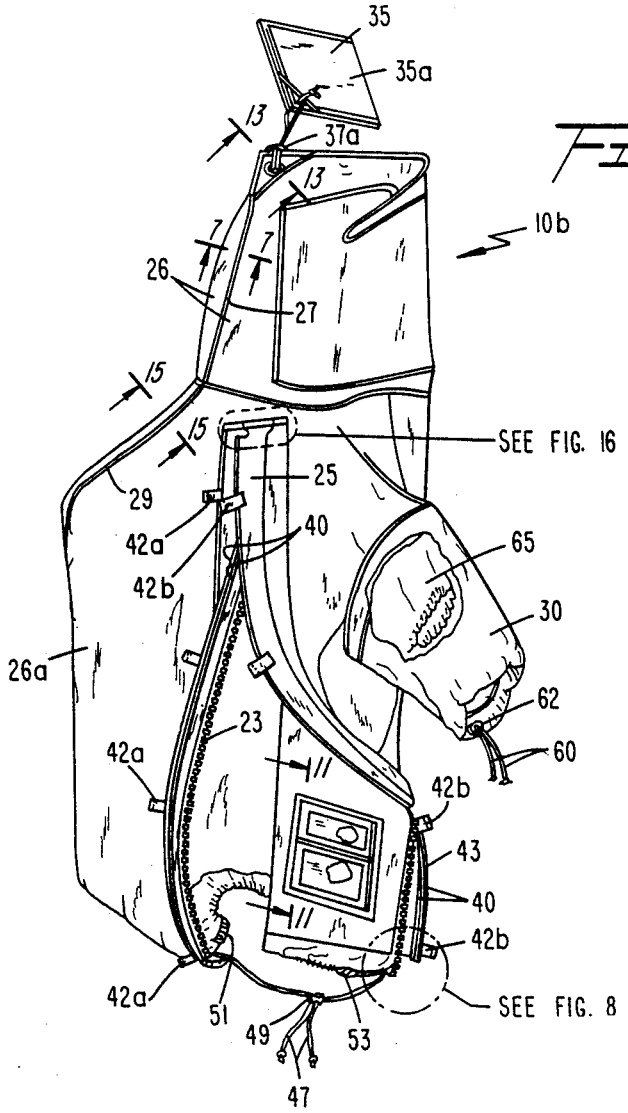
FIG. 3 is a rear plan view of the hood-jacket illustrating various primary and secondary seals of the jacket.
Figure 3E:
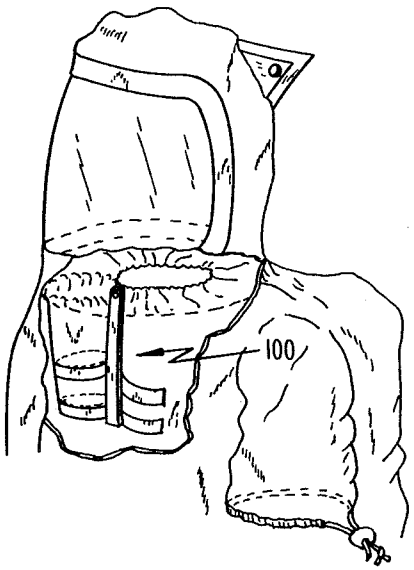
FIG. 3E is a partial perspective side elevational view of the cone seal of FIG. 17.
Figure 3A:
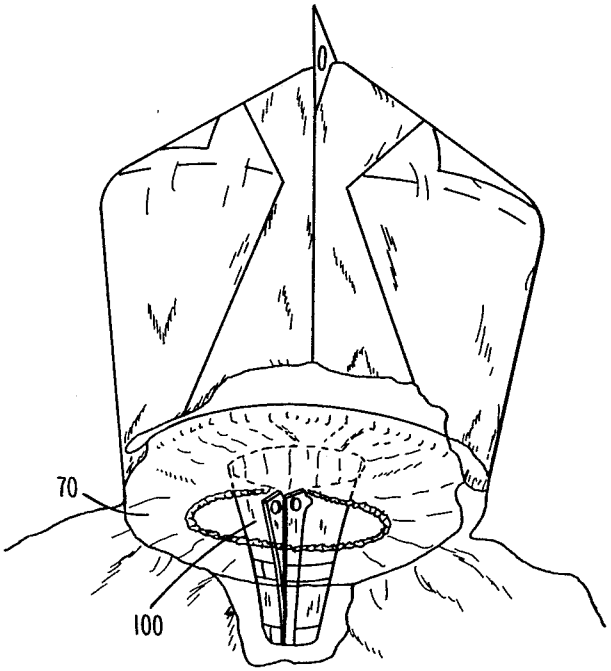
FIG. 3A is a partial perspective rear view of the interior of the hood portion depicting the neck collar barrier and cone seal configuration.
Figure 3B:
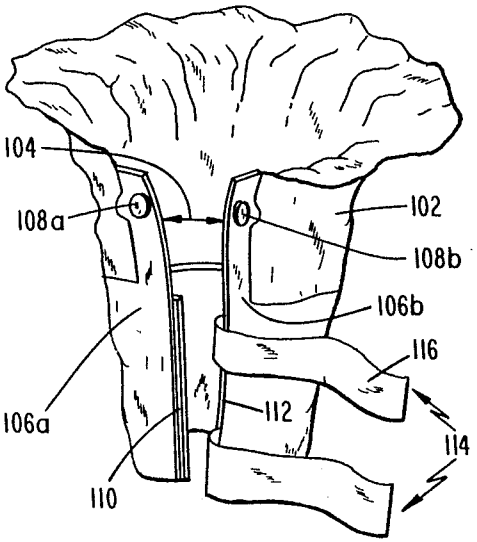
FIGS. 3B, 3C and 3D are partial perspective views of the cone seal configuration in open, partially closed and fully closed positions, respectively.
Figure 3C:
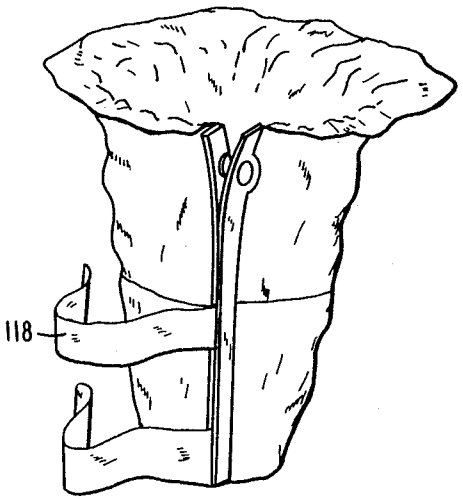
Figure 3D:
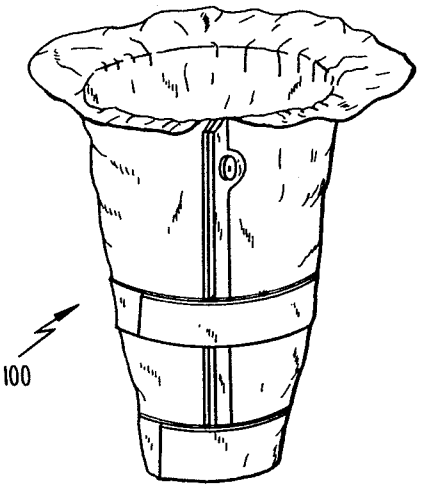
Figure 4:
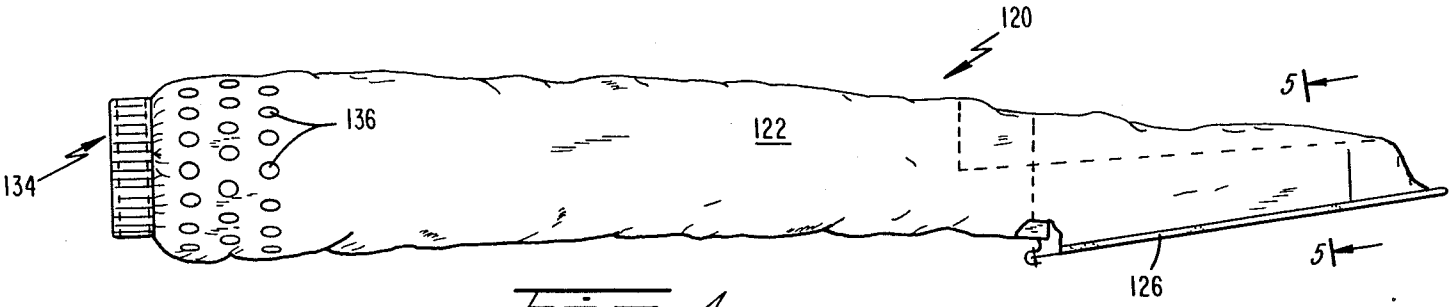
FIG. 4 is a side elevational view of a first embodiment of an exhalation duct in accordance with the present invention.
Figure 7:
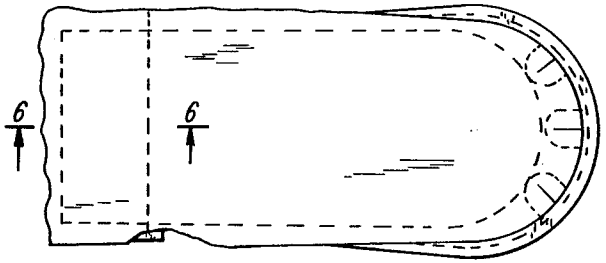
FIG. 7 is a detailed top plan view of the sealing end of the exhalation duct of FIG. 4.
Figure 6:
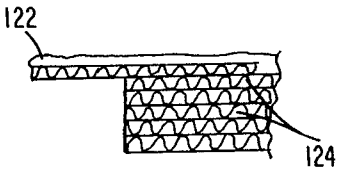
FIG. 6 is a sectional view taken along the line 6—6 of FIG. 5.
Figure 5:
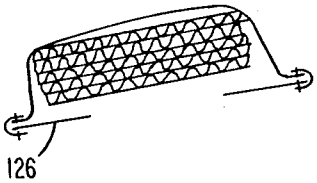
FIG. 5 is a sectional view taken along the line 5—5 of FIG. 4.

With reference to FIGS. 5–7, it can be seen that the upper portion of exhalation duct 120 is formed with a plurality of spacer material layers 124 to ensure that the generally cylindrical duct has sufficiently rigid properties in the radial direction thereof and in the upper portion so as to prevent blockage or excessive compression that might be caused by the cone seal 100 or by flattening of the upper portion of the duct by the wearer's upper torso that might otherwise impede the flow of exhalation air from the mask to the elastic end 134. As depicted in FIG. 6, the lower portion of duct 120 may be formed with a single layer of spacer material 124.

Figure 10:
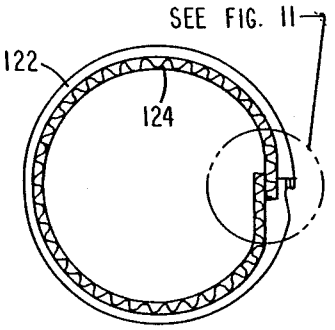
FIG. 10 is a cross-sectional view of the duct of FIG. 4.
Figure 9:
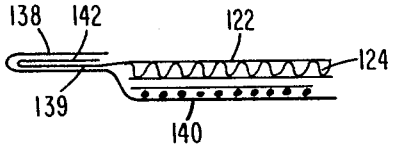
FIG. 9 is a sectional view taken along the line 9—9 of FIG. 8.
Figure 8:
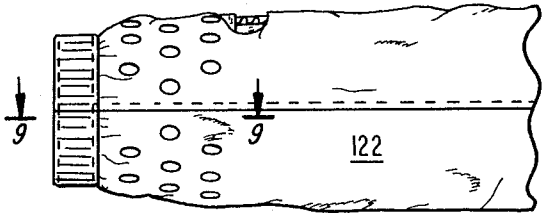
FIG. 8 is a detailed plan view of the venting lower end of the exhalation duct of FIG. 4.
Figure 11:
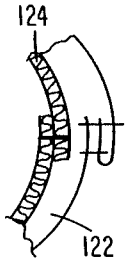
FIG. 11 is a view of the manner in which the spacer material and cover forming the exhalation duct are sealed together along the length of the duct.

The covering 122 may be stitched and heat-sealed to the outer periphery of seal 128, as depicted in FIGS. 5 and 12. With reference to FIGS. 10 and 11, the covering 122 and spacer material layer 124 may be stitched together along their opposite longitudinal edges and heat-sealed to define a sealed seam extending the length of the duct 120. With reference to FIG. 9, the portion of duct 120 in the region of exhalation holes 136 may include a cloth material, such as butyl coated cloth that sandwiches the spacer material 124 in cooperation with covering 122. Edges 138 and 139 of cloth 140 and covering 122 respectively may overlap each other for stitching and heat-sealing together with elastic material 142 completing the elastic end 134 (FIG. 9).

Figure 14:
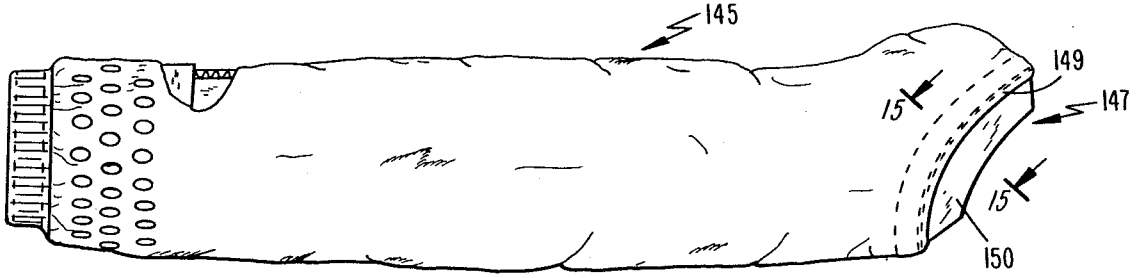
FIG. 14 is a detailed side plan view of an exhalation duct in accordance with a second embodiment of the present invention.
Figure 15:
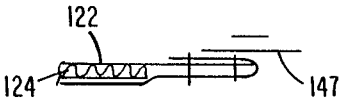
FIG. 15 is a sectional view taken along the line 15—15 of FIG. 14.
Figure 16:
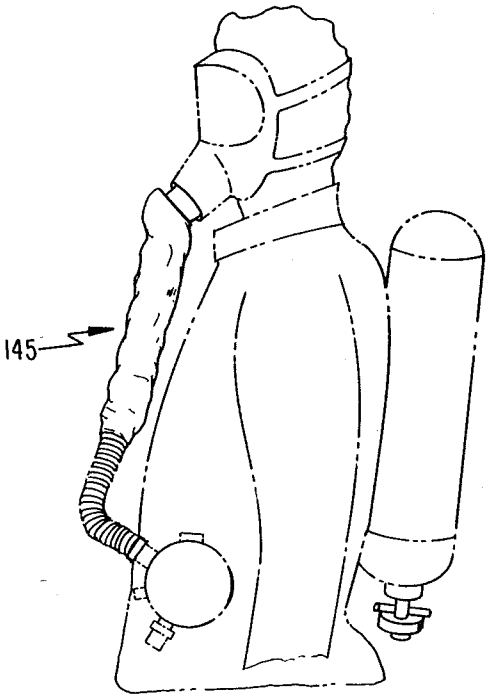
FIG. 16 is a perspective view of a type of BA mask worn in conjunction with the FIG. 14 embodiment of the invention.

FIGS. 14–16 are illustrations of a second embodiment of an exhalation duct 145 according to the present invention which is substantially identical to exhalation duct 120 of the first embodiment except at its upper end 147 providing sealing contact with a Survivaire Mark I BA depicted in FIG. 16. Thus, with reference to FIG. 15, the upper end 147 has the upper ends of covering 122 and spacer material 124 stitched and sealed together with further stitching and sealing at 149 to an annular rubber seal 150. The Survivaire BA of FIG. 16 has the exhalation valve in front of and slightly below the chin and the air supply hose connector directly below it. This duct 145 is assembled to the BA in the same manner as duct 120. The air supply hose of the BA is inserted through the spacer material and out through the rubber seal 147. However, after the air hose 18 is connected to the face mask, the rubber seal 147 having a single central opening (not shown) is stretched over both the air hose connector and the exhalation valve and adjusted flush to the mask. Otherwise, the duct 145 functions exactly as that of the duct 120 of the first embodiment.

Figure 17:
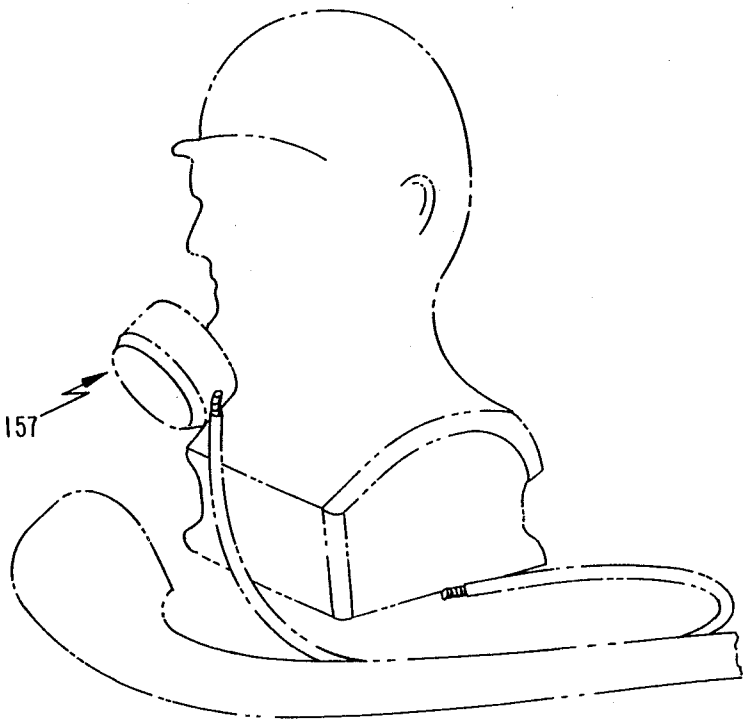
FIG. 17 is a perspective view of a third type of mask.
Figure 18:
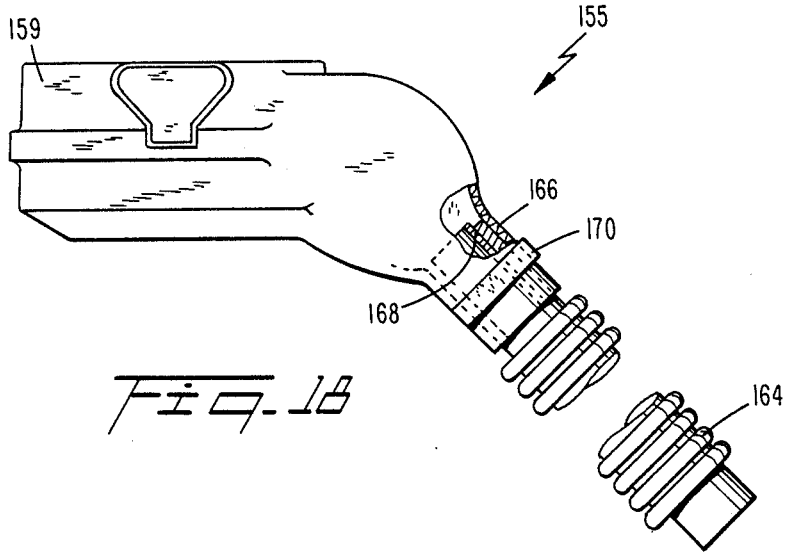
FIG. 18 is a detailed elevational view of an exhalation duct in accordance with a third embodiment of the invention worn in conjunction with the mask of FIG. 17.
Figure 19:
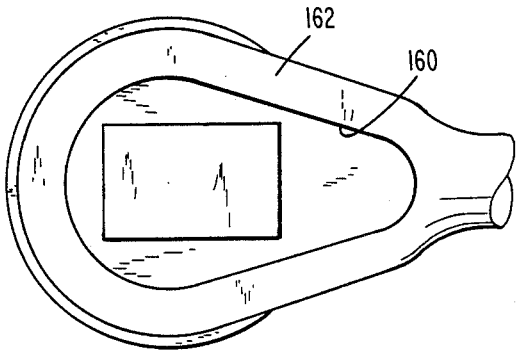
FIG. 19 is a top plan view of the upper sealing end of the exhalation duct of FIG. 18.

FIGS. 17–19 are illustrations of a third embodiment of the invention wherein an exhalation duct 155 is used in conjunction with a Scott Presur Pak 4.5 breathing apparatus depicted in FIG. 17. The principal end function of this duct 155 is the same as ducts 120 and 145, although the configuration is different. The regulator 157 of the Scott breathing apparatus is mounted on the front of the mask and appears as a cylindrical can in shape. The exhalation valve is located at the back and bottom of the air regulator 157, facing the mask. The exhalation duct 155 comprises an exhalation valve cover 159 of molded rubber which fits over the entire air regulator 157 inserted into the rubber cover through opening 160 defined by inturned edges 162. A corrugated rubber hose 164 connected to an outlet opening 166 of valve cover 159 via bushing 168 and clamp 170 is adapted to extend through cone seal 164 to direct exhalation ads through the hose into the torso area. Although not shown, the valve cover 159 may have openings on either side of bushing 168 which respectively accommodate the smaller diameter air supply hose 18 and a purge valve.

It should be apparent from the preceding that this invention may be practiced otherwise than as specifically described and disclosed herein. Modifications may therefor be made to these specific embodiments disclosed here without departing from the scope of this invention and such as intended to be included within the claims appended below.

What is claimed is:

1. An exhalation duct for a breathing mask, said mask having an exhalation valve and a breathing hose in the form of a linear air hose attached to an air-supply tank, comprising:

a rubber plate-like sealing sheet having a first and second hole, said first hole for sealing attachment to said exhalation valve, and said second hole for sealing attachment and passage of said breathing hose, a substantially cylindrical flexible length of multi-layered porous rigid circular space material forming a flexible cylindrical passage and loosely enclosing said linear breathing hose, said cylindrical length of said spacer material having a larger diameter than said breathing hose which passes out of said length of said spacer material, said spacer material having rigidity in the radical direction to resist compression, a linear gas impermeable protective covering of lightweight butyl coated cloth surrounding and enclosing said cylindrical length of spacer material, said covering having a first and second end, said first end for sealing attachment to said sealing sheet, and said second end being elastic and having a plurality of vents communicating with said spacer material for passage of air from said exhalation valve.

2. An exhalation duct for a breathing mask, said mask having an exhalation valve and a breathing hose in the form of a linear hose having a connector, comprising:

an annular rubber seal having a central opening stretching over said exhalation valve and said breathing hose connector, a substantially cylindrical flexible length of multi-layered porous rigid circular spacer material defining a cylindrical passage loosely enclosing said linear breathing hose, said cylindrical length of said spacer material having a larger diameter than said breathing hose which passes out of said length of said spacer material, said spacer material having rigidity in the radical direction to resist compression, a linear gas-impermeable protective covering of lightweight butyl coated cloth surrounding and enclosing said cylindrical length of said spacer material, said covering having a first and second end, said first end for sealing attachment to said annular rubber seal, and said second end for being elastic and having a plurality of vents communicating with said spacer material for passage of air form said exhalation valve.

3. An exhalation duct provided for a breathing mask, said mask having a regulator with an exhalation valve and a breathing hose in the form of a linear air hose attached to an air-supply tank, comprising:

an exhalation valve cover of molded rubber communicating with said regulator and enclosing said exhalation valve and said linear breathing air hose attachment to said regulator, and a flexible length of corrugated rubber hose communicating with said exhalation valve cover.

* * * * *